(12) United States Patent
Hokao et al.

(10) Patent No.: US 6,652,149 B2
(45) Date of Patent: Nov. 25, 2003

(54) ROLLING BEARING

(75) Inventors: Michita Hokao, Kanagawa (JP); Kenichi Iso, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/076,403

(22) Filed: Feb. 19, 2002

(65) Prior Publication Data

US 2002/0159662 A1 Oct. 31, 2002

(30) Foreign Application Priority Data

Feb. 20, 2001 (JP) .................................. P.2001-043646
May 8, 2001 (JP) .................................. P.2001-137453

(51) Int. Cl.$^7$ ............................................. F16C 33/66
(52) U.S. Cl. ...................................... 384/462; 384/476
(58) Field of Search ............................... 384/462, 575, 384/576, 580, 484, 476

(56) References Cited

U.S. PATENT DOCUMENTS 5,961,222 A * 10/1999 Yabe et al. ................. 384/476

FOREIGN PATENT DOCUMENTS

| JP | 1307516 | * 12/1989 |
| JP | 2878749 | 1/1999 |
| JP | 11-72120 | 3/1999 |

* cited by examiner

Primary Examiner—Lenard A. Footland
(74) Attorney, Agent, or Firm—Sughrue Mion, PLLC

(57) ABSTRACT

In a rolling bearing, a plurality of rolling elements are rollably retained by a retainer between an inner ring and an outer ring, while being substantially equidistantly arranged. The rolling bearing is filled with a grease composition which contains a base oil including of fluorocarbon polymer oil, and a thickening agent including a polytetrafluoroethylene. A conductive material is added in an amount of 0.1 to 10 wt %, based on the total weight of the grease composition, to the grease composition.

19 Claims, 4 Drawing Sheets

ROLLING BEARING

BACKGROUND OF THE PRESENT INVENTION

The present invention relates to a rolling bearing filled with grease compositions.

More particularly, the present invention relates to a rolling bearing having excellent durability and long lifetime, which is suitably applied to a device which is run under conditions of high temperature, high speed and high load and water is easy to enter into it, such as vehicle electrical component parts, an alternator and an intermediate pulley as an engine auxiliary equipment, and an electromagnetic clutch for car air-conditioner.

It is a common practice that rolling bearings are used for vehicle electrical component parts, an alternator and an intermediate pulley as an engine auxiliary equipment, an electromagnetic clutch for car air-conditioner, and the like. Grease is mainly used for the lubrication of the rolling bearings.

There is an increasing demand of size reduction, high performance and high power in the vehicle electrical component parts and the engine auxiliary equipment. In this circumstance, with the result of the size reduction, the output power reduction inevitably occurs. In the alternator and electromagnetic clutch for car air-conditioner, the power reduction is compensated by increasing their speed. In this case, the intermediate pulley also increases speed thereof and generates heat. The demands of improving the silence within a car cabin prompts sealing performance of the engine room. However, on account of temperature increasing in the highly sealed engine room, the related parts are required to endure high temperature.

On the other hand, the grease for the rolling bearing used in the related component parts generally contains a synthetic oil as a base oil and a urea compound as a thickening agent. A bearing lubricating lifetime of the urea/synthetic oil base grease is long in the temperature range up to 180° C., and is sufficient in practical use. However, working temperature is increasing in the recent tendency of the rolling bearing, as described above. In such a condition that the bearing temperature is 200° C. or higher, base oil may evaporates, the grease will be harden by evaporation of the base oil, and the grease will be soften by destruction of the thickening agent. Accordingly, in the case of the rolling bearing using the urea/synthetic oil base grease, seizure will occur in the rolling bearing in an early stage of a condition that the bearing temperature is 200° C. or higher.

The rolling bearings incorporated into the component parts are used in high temperature, high speed, high load conditions. Accordingly, the grease is dissolved to sometimes generate hydrogen, as described above Japanese patent No. 2878749. The generated hydrogen invades into the bearing steel, so that the rolling bearing suffers from the flaking being attendant with a white structure caused by the hydrogen brittleness. The white structure is a type of structural changes. How to prevent the flaking is an additional important problem.

Those rolling bearings are used for the auxiliary equipment for driving the belt located outside the engine, and frequently receive muddy and rain water from the road surface. In those bearings, the invading of water into the bearing may be prevented partly by the contact rubber seal. However, it is impossible to perfectly prevent the invading of water at the present stage. The automobile engine is repeatedly driven and stopped. When the engine is at rest, temperature within the housing of the rolling bearing drops and reaches a dew point, and moisture in the air around the bearing condenses into water droplets. As a result, droplets sometimes attach to the bearings or invades into the lubricant. As disclosed in JP-A-11-72120, the water which entered into the bearing generates hydrogen, and as in the above case, the flaking being attendant with the white structure caused by the hydrogen brittleness occurs in the bearing.

The rolling bearings of the above component parts are rotated by a pulley drive system using the belt. Accordingly, static electricity is generated between the belt and the pulleys. Normally, the inner and outer rings are electrically insulated from each other by an oil film of the lubricant, and a large potential difference is present between them. When those are brought into metallic contact with each other by a strong vibration or the like, current flows, at a dash, between the inner and outer rings are conductive. The DC voltage produced electrolyzes the water, and promotes the generation of hydrogen ions. As a result, the flaking being attendant with the white structure caused by the hydrogen brittleness is more likely to occur in the bearing.

It is almost impossible to use the urea/synthetic oil base grease in a high temperature environment of 200° C. or higher. For this reason, the grease cannot satisfy the requirement of further increasing the heat resistance.

As described above, due to the entering of water from outside, such problem arises that the rolling bearings incorporated into the component parts are likely to suffer from the flaking being attendant with the white structure caused by the hydrogen brittleness, and static electricity in the bearing promotes the flaking. How to prevent the flaking is an additional important problem. To cope with the problem, there is a proposal in which to prevent the invading of hydrogen into the bearing, an oxidized film is formed on the surfaces of the inner and outer rings and the rolling elements by blending a passivating oxidizing agent into the grease (Japanese patent No. 2878749). There is another proposal as disclosed in JP-A-11-72120. In the proposal, pH of the grease is adjusted to be within a range from 5 to 13, whereby the progress of the cathode reaction for causing the hydrogen brittleness is restrained.

However, the former proposal fails to prevent the invading of hydrogen till the oxidized film is formed. Further, it can insufficiently prevent the hydrogen invading unless the oxidized film is completely and closely formed. On the other hand, in the latter proposal, the adjusted pH value sometimes varies from the value as first adjusted. Accordingly, it is difficult to secure the stable effect.

SUMMARY OF THE PRESENT INVENTION

Accordingly, the present invention has an object to provide a rolling bearing which is free from the flaking being attendant with the white structure caused by the hydrogen brittleness even when it is used under the conditions of high temperature, high speed and high load, and receives water from outside, and has a long lifetime.

To achieve the above object, there is provided a rolling bearing according to the first aspect of the present invention comprising: an inner ring; an outer ring; a plurality of rolling elements arranged rotatably between the inner ring and the outer ring; a retainer for retaining the plurality of rolling elements; and a grease composition filled in a bearing space defined by the inner ring, the outer ring, and the rolling elements; wherein the grease composition contains a base oil including of fluorocarbon polymer oil, a thickening agent including a polytetrafluoroethylene, and a conductive material, wherein an amount of the conductive material contained in the grease composition is in a range from 0.1 to 10 wt % with respect to the total weight of the grease composition.

In the rolling bearing of the present invention, the grease composition contains a base oil comprising of fluorocarbon polymer oil and PTFE. Therefore, the rolling bearing has a high heat resistance and it has high anti-seizure properties in a temperature condition of approximately 200° C. The electrolyzing of water, which promotes the hydrogen ions generation, is prevented by permitting an electrical conduction between the inner ring and outer ring by using the conductive material. As a result, it is prevented that the flaking being attendant with the white structure caused by the hydrogen brittleness occurs.

To achieve the above object, there is provided a rolling bearing being lubricated by grease and used for vehicle electrical component parts and engine auxiliary equipment, the rolling bearing according to a second aspect of the present invention comprising: an inner ring; an outer ring; a plurality of rolling elements arranged rotatably between the inner ring and the outer ring; a retainer for retaining the plurality of rolling elements; and a grease filling the rolling bearing; wherein the grease contains a base oil and a thickening agent including carbon black.

As described above, static electricity generated between the belt and the pulley promotes the generation of hydrogen ions. However, by using the carbon black as a conductive material for the thickening agent, the grease is always put in a conductive state. Accordingly, little potential difference is present between the inner and outer rings, and there is less chance of electrolyzing water. Therefore, it is restrained that the flaking being attendant with the white structure occurs and progresses. Additionally, this effect appears immediately after the bearing is filled with the grease, and little varies with time.

BRIEF DESCRIPTION OF THE DRAWINGS

Other objects, advantages and features of the present invention will be apparent when carefully reading the detailed description in connection with the drawings.

DETAILED DESCRIPTION OF THE PREFERRED EMBODIMENTS

The preferred embodiments of the present invention will be described in detail with reference to the accompanying drawings.

Figure 1:
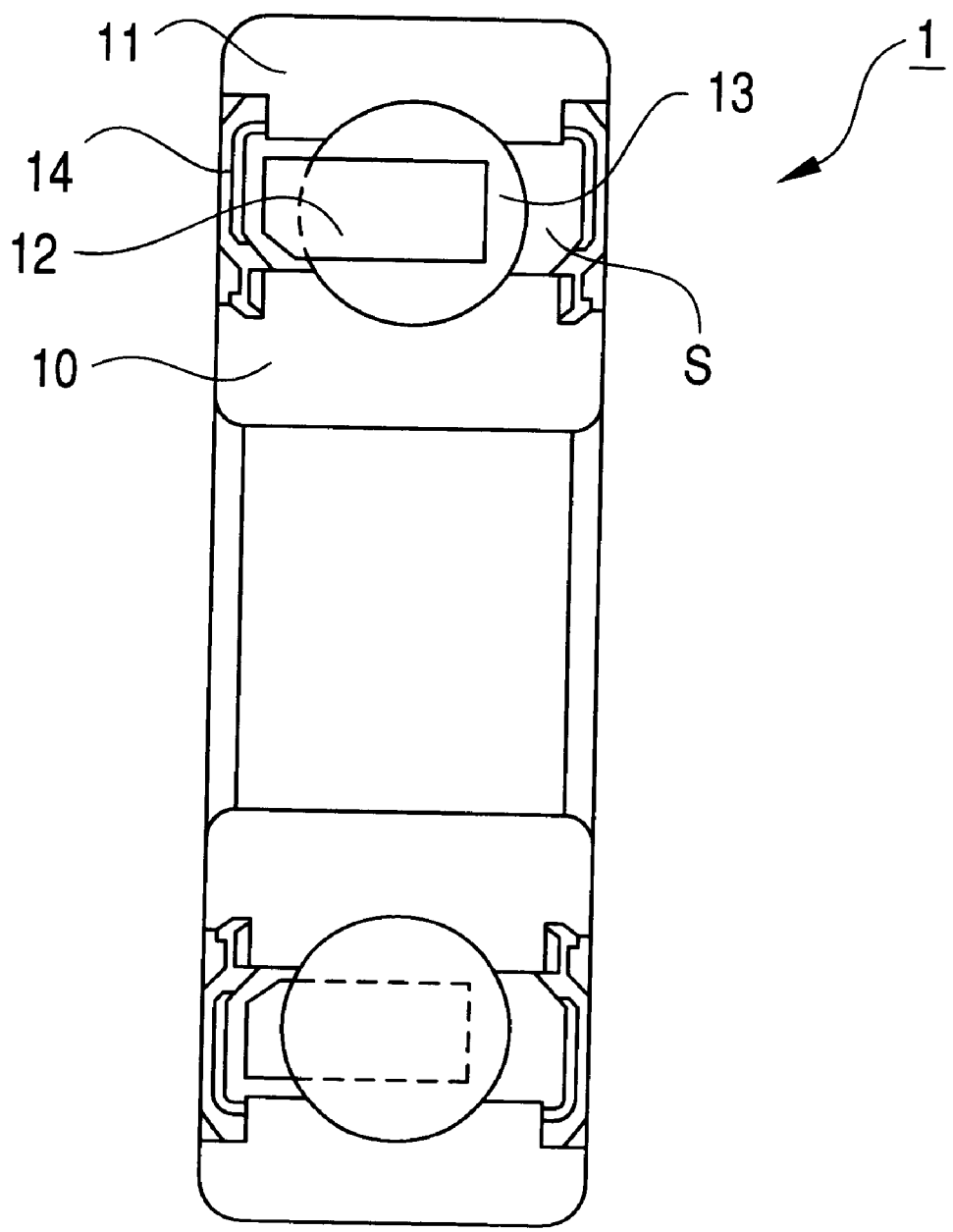
FIG. 1 is a cross sectional view showing an embodiment of a rolling bearing according to the present invention.

A construction of a rolling bearing of the present invention is not limited to a specific one, such as shown in FIG. 1.

A ball bearing 1, which is shown in a cross sectional view in FIG. 1, may be presented for an example of the rolling bearing of the present invention. In the ball bearing 1, balls 13 as a plurality of rolling elements are substantially equidistantly retained in a retainer 12 rotatably between an inner ring 10 and an outer ring 11. A bearing space S defined by the inner ring 10, the outer ring 11 and the balls 13 is filled with a predetermined amount of grease composition (not shown) to be described later, and is sealingly closed with a seal 14.

Hereinafter, a grease composition filling into the bearing space S of the rolling bearing according to the first aspect of the present invention will be explained.

First Aspect of the Invention

Base Oil

Every kind of fluorocarbon polymer oils may be used for a base oil of the grease composition. The fluorocarbon polymer oil whose viscosity is from 20 to 200 mm²/sec, in particular from 30 to 180 mm²/sec, at 40° C., is preferable for the base oil. When the viscosity is in excess of 200 mm²/sec at 40° C., resistance to stirring is large and great heat is generated. Accordingly, the respective component parts (inner ring, outer ring and rolling elements) of the rolling bearing expand, an internal clearance reduces, and an abnormal wear and seizure may occur in the bearing. When the viscosity is less than 20 mm²/sec at 40° C., an insufficient oil film is formed. As a result, a metallic contact occurs between the parts and the seizure will occur in an early stage.

A preferable chemical structure of the fluorocarbon polymer oil is a side-chain structure as given in formula (1) or (2) rather than a straight-chain structure. In the formulas, "m" and "n" are positive integers.

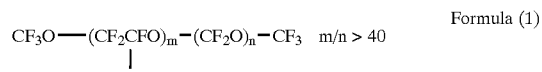

Formula (1)

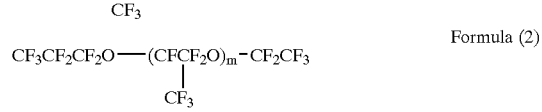

Formula (2)

Generally, the fluorocarbon polymer oil having a straight-chain structure has a high viscosity index. Where the fluorocarbon polymer oil is used, the torque characteristics of the bearing are stable over a broad range of temperature. However, the anti-seizure properties of the bearing are unsatisfactory since the heat generation is inevitable. On the other hand, the fluorocarbon polymer oil having a side-chain structure has a nature of small temperature rise. Therefore, this fluorocarbon polymer oil has excellent anti-seizure properties, and is suitable for the roll bearings used in the component parts.

Thickening Agent

Every kind of PTFEs may be used for the thickening agent. The shape of the PTFE may be spherical or polyhedral (cubic or rectangular parallelepiped), acicular in extreme case. These PTFE may be used singly or in admixture. Such a thickening agent is preferably incorporated in the grease in such an amount that a worked penetration of the grease composition is within the grades of No. 1 to No. 3 as defined in NLGI (The National Lubricating Grease Institute) in order that the grease has a fluidity suitable for the present invention.

Conductive Material

The conductive material is an essential additive to the grease composition to be filled in the rolling bearing of the present invention. The conductive material is not specifically limited if it has a good conductivity, and may be a liquid or a solid. Above all, a carbon black is preferable, since it is easily available and it does not deteriorate the lubricating property of the grease. Taking into account the dispersion properties of the carbon black in the grease composition, it is preferable to use a particulate carbon black whose average particle size is within a range from approximately 10 to 300 nm.

A preferable adding amount of the conductive material is from 0.1 to 10 wt % based on the total weight of the grease composition. If the additive amount of the conductive material is smaller than the above lower limit value, the grease composition is given an insufficient electrical conductivity. If it is larger than the above upper limit value, the grease composition is hardened and the seizure life of the bearing will be reduced. To ensure the electrical conductivity and the seizure life of the bearing, it is desirable that the adding amount of the conductive material is 0.5 to 10 wt % based on the total weight of the grease composition. It is more preferable that worked penetration of the grease composition after the electrical conductive material is added to the grease is an amount within the grades of No. 1 to No. 3 as defined in the NLGI.

Additives

In the present invention, the grease composition may be added with known additives, such as antioxidant, antirust and extreme-pressure additive, in addition to the fluorocarbon polymer oil, PTFE and conductive material, so long as its preferable properties are not lost. The total amount of those additives is preferably less than 10 wt % based on the total weight of the grease composition.

Process of Preparing the Grease Composition

There is no special limitation on a process of preparing the grease composition. A predetermined amount of conductive material is preferably blended into a base grease followed from the fluorocarbon polymer oil and the PTFE. Following the addition of the conductive material to the blended, the ingredients are well kneaded by the kneader or the rolling mill to be homogeneous. Heating of the ingredients is also effective during this process. In the grease composition preparing process, it is preferable to add such additional additives as antirust and antioxidant, together with the conductive material, into the grease composition.

Hereinafter, a grease composition filling into the bearing space S of the rolling bearing according to the second aspect of the present invention will be explained.

Second Aspect of the Invention

Base Oil

A base oil contained in a grease composition is not limited to specific oils, but every kind of oils usually used for lubricant oils may be used for the base oil. To suppress the generation of abnormal sounds owing to insufficient low-temperature fluidity of the base oil when the vehicle is started at low temperature condition, in particular to secure a satisfactory durability at high temperature of 200° C. or higher, a synthetic lubricant oil whose kinetic viscosity is from 30 to 250 mm$^2$/sec, more preferably from 50 to 200 mm$^2$/sec, at 40° C., is preferable for the base oil. When the kinetic viscosity is less than 30 mm$^2$/sec at 40° C., an insufficient oil film is formed at high temperature of 200° C. or higher. Accordingly, a metallic contact occurs between the parts and the seizure will easily occur in an early stage. When the kinetic viscosity is in excess of 250 mm$^2$/sec at 40° C., a stirring resistance of the grease is large and heat value is increased. In this condition, the respective component parts (inner ring, outer ring and rolling elements) of the rolling bearing expand, internal clearances reduce, and the abnormal wear and seizure will be easy to occur in the bearing. The fluidity of the grease is also poor at low temperature. Therefore, it is difficult for the grease to provide a satisfactory low-temperature start-up performance of the rolling bearings, which are used for vehicle electrical component parts and engine auxiliary equipment.

Hydrocarbon oils, aromatic oils, ester oils, and ether oils may be enumerated for the synthetic lubricant oil. Examples of hydrocarbon oils are poly-α-olefins, e.g., a normal paraffin, an isoparaffin, a polybutene, a polyisobutylene, a 1-decene oligomer; a 1-decene, and ethylene co-oligomer, or their hydrides. Examples of aromatic oils are alkylbenzenes e.g., a monoalkylbenzene and a dialkylbenzene, and alkylnaphthalenes, e.g., a monoalkylnaphthalene, a dialkylnaphthalene, and a polyalkylnaphthalene. Examples of ester oils are diester oils, e.g., a dibutyl sebacate, a di-2-ethylhexyl sebacate, a dioctyl adipate, a di-isodecyle adipate, a di-tridecyleadipate, a di-tridecyle glutarate, and a methyl acetylcinoleate. Other examples of ether oils are aromatic ester oils, e.g., a trioctyl trimellitate, a tridecyle trimellitate, and a tetraoctyl pyromellitate. Further examples of ether oils are polyol ester oils such as a trimethylolpropane caprylate, a trimethylolpropane pelargonate, a pentaerythritol-2-ethylhexanoate, and a pentaerythritol pelargonate. Additional examples of ether oils are complex ester oils which are oligoesters of a polyvalent alcohol and a mixed fatty acid containing dibasic acid and monobasic acid. Examples of ether oils are polyglycols, such as a polyethylene glycol, a polypropylene glycol, a polyethylene glycol monoether, and a polypropylene glycol monoether. Additonal examples of ether oils are phenyl ether oils, such as a monoalkyl triphenyl ether, an alkyl diphenyl ether, a dialkyl diphenyl ether, a pentaphenyl ether, a tetraphenyl ether, a monoalkyl tetraphenyl ether, and a dialkyl tetraphenyl ether. Other examples of synthetic lubricant base oils are a tricresyl phosphate, a silicone oil, and a perfluoroalkyl ether. Those synthetic lubricant oils may be used singly or in admixture, and those synthetic lubricant oils are adjusted to have preferable kinematic viscosity values mentioned above.

A mineral oil or natural lubricant oil may additionally be contained so far as the high temperature endurance is not deteriorated. The mineral lubricant oil may be prepared by appropriately combining vacuum distillation, oil solution deasphalting, solvent extraction, hydrocracking, solvent dewaxing, sulfuric acid cleaning, clay treatment, and hydrotreatment, and by refining the resultant. Examples of natural oils for the lubricant oil are fats and fatty oils such as a beef tallow, a lard, a soybean oil, a rape oil, a rice bran oil, a coconut oil, a palm oil, and a palm kernel oil and those hydrides.

Thickening Agent

Every kind of carbon blacks may be used for the thickening agent, viz., regardless of materials and the process of preparing them. There is no special limitation on particle size of the carbon black. However, taking into account the dispersion properties of the carbon black in the grease composition, it is preferable to use a particulate carbon black whose average particle size is within a range from approximately 10 to 300 nm. Plural kinds of carbon blacks as mixed may also be used.

Taking into account a fluidity of grease, the thickening agent is incorporated in the grease in such an amount that a worked penetration of the grease composition is within the grades of No. 1 to No. 3 as defined in the NLGI. Specifically, the amount of the carbon black is within a range from 4 to 30 wt %, based on the total weight of the grease composition. Where the amount of carbon black added is less than 4 wt %, its thickening effect is insufficient. It is difficult to produce the grease whose worked penetration falls within the grades. Where its amount exceeds 30 wt %, the amount of the base oil decreases relative to the remaining composition materials, and the lubrication is likely to be unsatisfactory.

Additives

To further improve the lubricating performance, the following additives may be added singly or in admixture to the grease, as the need arises. The additives are antioxidant, antirust, extreme-pressure additive, oiliness additive, metal inactivator, viscosity index improver and detergent-dispersant. Those additives may be known additives, and their amounts is not particularly limited. When the amount of the additive is excessive, the amount of the base oil and the carbon black decrease relative to other composition materials. Accordingly, the amount of those additives is preferably less than 10 wt %, based on the total weight of the grease.

Process of Preparing the Grease Composition

There is no special limitation on a process of preparing the grease composition. Since the carbon black is a solid material, following the addition of the carbon black, the ingredients are well kneaded by the kneader or the rolling mill to be homogeneous. Heating of the ingredients is also effective during this process. In the grease composition preparing process, it is preferable to add such additional additives as antioxidant and antirust, together with the carbon black, into the grease composition.

EXAMPLES

The present invention will be described in more detail by use of examples and comparative examples. It should be understood that the present invention is not limited to those examples.

Preparing of Sample Greases

Sample greases for examples and comparative examples were prepared. Compositions of the sample greases were as shown in Table 1. In the table, abase oil A is the fluorocarbon polymer oil expressed by the general formula (1), and a base oil B is a fluorocarbon polymer oil expressed by a general formula (3). A carbon black having an average particle size of 30 nm was used. For preparing sample greases, fluorocarbon polymer oils used in Example A and Example B are different in their kinematic viscosity. In Example C, an amount of carbon black added was varied. Those sample greases were each adjusted so that a worked penetration of the grease composition falls within the grades of No. 1 to No. 3 as prescribed in NLGI.

TABLE 1

Examples & Comparative Example

| | Example A | Example B | Example C | Comparative Example A |
|---|---|---|---|---|
| Thickening agent | PTFE | PTFE | PTFE | Urea compound |
| Base oil | Base oil A | Base oil B | Base oil A | Synthetic hydrocarbon oil |
| Base oil viscosity mm²/sec, 40° C. | 15, 30, 60, 120, 180, 250 | 20, 60, 100, 200, 300 | 60 | 100 |
| Carbon black | 2 wt % | 2 wt % | From 0.05 to 12 wt % | None |

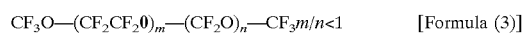

$$CF_3O-(CF_2CF_2O)_m-(CF_2O)_n-CF_3 \quad m/n<1 \qquad \text{[Formula (3)]}$$

In the formula, "m" and "n" are positive integers.

Test 1: High-Temperature Seizure Life Test

Figure 2:
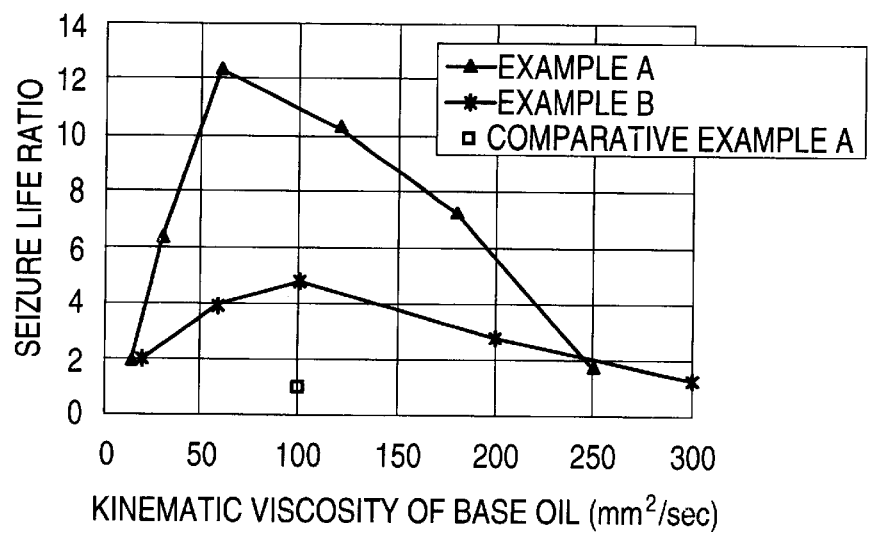
FIG. 2 is a graph showing the results of a test-1 in Examples.

Deep groove ball bearings having contact rubber seals were used. Dimensions of each ball bearing were: inside diameter=17 mm, outside diameter=47 mm, and width=14 mm. Sample greases of Examples A and B and Comparative Example A as used for comparison filled in the spaces of the ball bearings. An amount of each grease filled was 30% of the bearing space of each bearing. Those bearings were continuously rotated under the conditions that a rotational speed of the inner ring was 20000 min$^{-1}$, temperature outside the bearing was 200° C. and a radial load was 686N. The test was ended when the seizure occurred and a temperature of the outer ring of the bearing was in excess of 220° C. The number of tests was 4. The bearings were compared on their lifetime. In the comparison, the lifetime of the Comparative Example A is set at 1. The results of the tests are shown in FIG. 2.

Test-2: Rapid Acceleration/Deceleration Test and High-Temperature Seizure Life Test The flaking lifetime of the bearing was evaluated by rapidly accelerating and decelerating the bearing assembled into an alternator. Sample greases of Example C and Comparative Example A as used for comparison filled in the spaces of deep groove ball bearings. An amount of each grease filled was 30% of the bearing space of each bearing. The bearing was continuously rotated for 300 hours as a rough standard under the conditions that the number of bearing revolutions is from 1200 to 9600 min$^{-1}$, the temperature of the outer ring of the bearing is 120° C., and the pulley load is 980N. The test was ended when a flaking phenomenon occurred in the bearing outer ring rolling surface and a vibration occurred. After the end of the test, a visual examination was conducted to know if a structural change in the bearing was present. The number of tests was 10 for each example, and a probability of flaking occurrence and a probability of structural change occurrence were calculated by using the following equations.

Flaking occurrence probability={(number of flaking occurrences/number of tests)}×100

Structural-change occurrence probability={(structural change occurrences/number of tests)}×100

Figure 3:
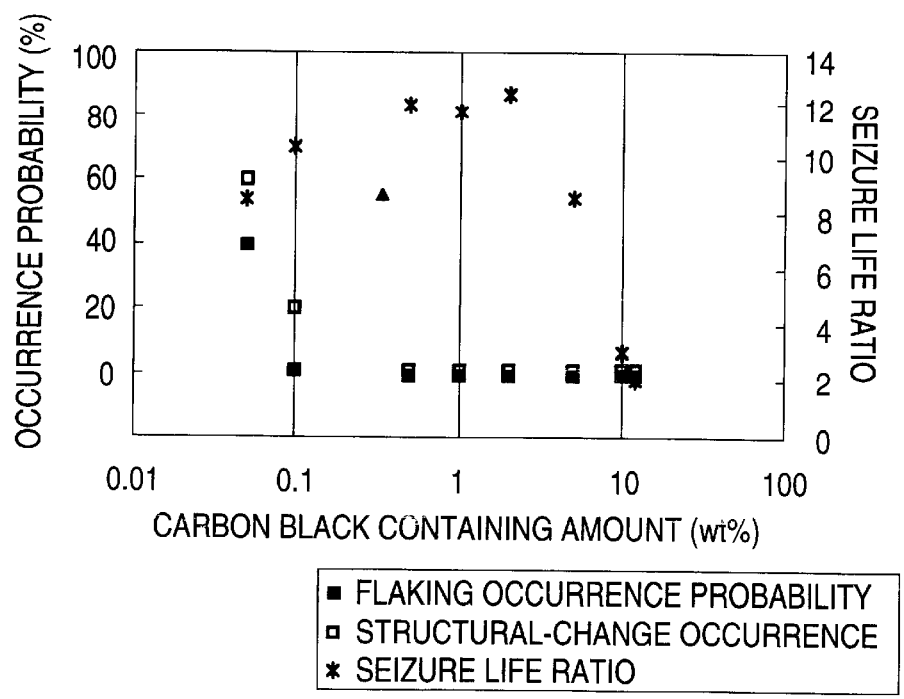
FIG. 3 is a graph showing the results of a test-2 in Examples.

The high-temperature seizure life test was conducted in the condition of the TEST 1. The bearings were compared on their lifetime. In the comparison, the lifetime of the Comparative Example A is set at 1. The results of the tests are shown in FIG. 3.

The results of both the tests teach the following fact. The rolling bearing, which is filled with a grease composition which contains a base oil including a fluorocarbon polymer oil, in particular a fluorocarbon polymer oil whose viscosity at 40° C. is from 20 to 200 mm$^2$/sec, and a thickening agent including a polytetrafluoroethylene. A carbon black is added in an amount of a range from 0.1 to 10 wt %, based on the total weight of the grease composition, to the grease composition, is excellent in seizure life, and low in both flaking occurrence probability and structural-change occurrence probability. Where the amount of carbon black added is less than 0.1 wt %, an electrical conductivity of the grease composition is insufficient. The flaking and structural change are easy to occur. Where it exceeds 10 wt %, the seizure is easy to occur.

Preparing of Sample Greases

Sample examples D and E and a comparative example B were prepared. Compositions of the examples and the comparative example were as shown in Table 3. Carbon black having an average particle size of 30 nm was used. The added carbon black is well kneaded by the rolling mill with base oil to be homogeneous. In the example A, the greases used are such that the kinematic viscosity values of the greases at 40° C. are different but within a range from 20 to 410 mm$^2$/sec. In the example B, the amount of the carbon black was adjusted within a range from 3 to 50 wt %. The examples were each adjusted so that a worked penetration of the grease composition falls within the grades of No. 1 to No. 3 as prescribed in NLGI.

TABLE 3

Examples & Comparative Example

|  | Example D | Example E | Comparative Example B |
|---|---|---|---|
| Thickening agent | Carbon black | Carbon black | Urea compound |
| Base oil | Phenyl ether oil | Polyol ester oil | Phenyl ether oil |
| Base oil kinematic viscosity *1 | 20–410 | 100 | 100 |
| Thickening agent amount *2 | 10 | 3–50 | 18 |

*1 kinematic viscosity at 40° C.: "mm$^2$/sec"
*2 unit: wt %

Deep groove ball bearings having contact rubber seals were used. Each ball bearing has a structure shown in FIG. 1, and dimensions of it were: inside diameter =17 mm, outside diameter =47 mm, and width =14 mm. Sample greases filled was 30% of the bearing space of each bearing.

Figure 4:
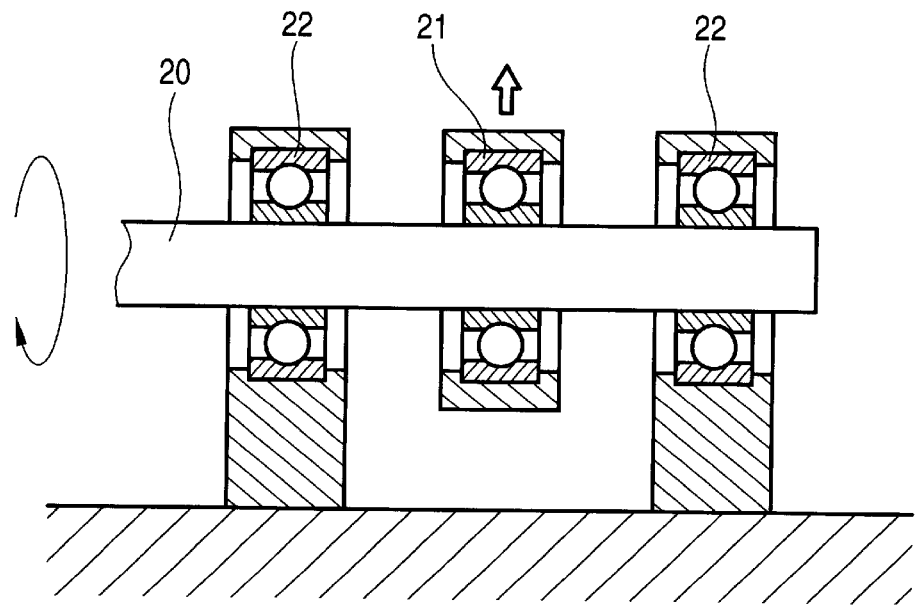
FIG. 4 is a longitudinal sectional view showing a tester used for a high-temperature seizure life test in an example.

A tester shown in FIG. 4 was used for the test. In the tester illustrated, a rotary shaft 20 is supported by a couple of support shaft bearings 22,22, and a test bearing 21 is set to a middle position of the shaft. The tester is placed in a constant temperature vessel (not shown) so that the entirety of it is kept at a predetermined temperature. By rotating the rotary shaft 20, the test bearing 21 was continuously rotated under the conditions that a rotational speed of the inner ring was 20000 min$^{-1}$, temperature outside the bearing was 200° C., and a radial load was 686N. The test was ended when the seizure occurred, a temperature of the outer ring of the bearing was in excess of 220° C. and a running torque rose suddenly, and time taken till that time was measured. The number of tests was 4. The bearings were compared on their lifetime. In the comparison, the lifetime of the test bearing C is set at 1. The results of the tests are shown in FIG. 5.

Figure 5:
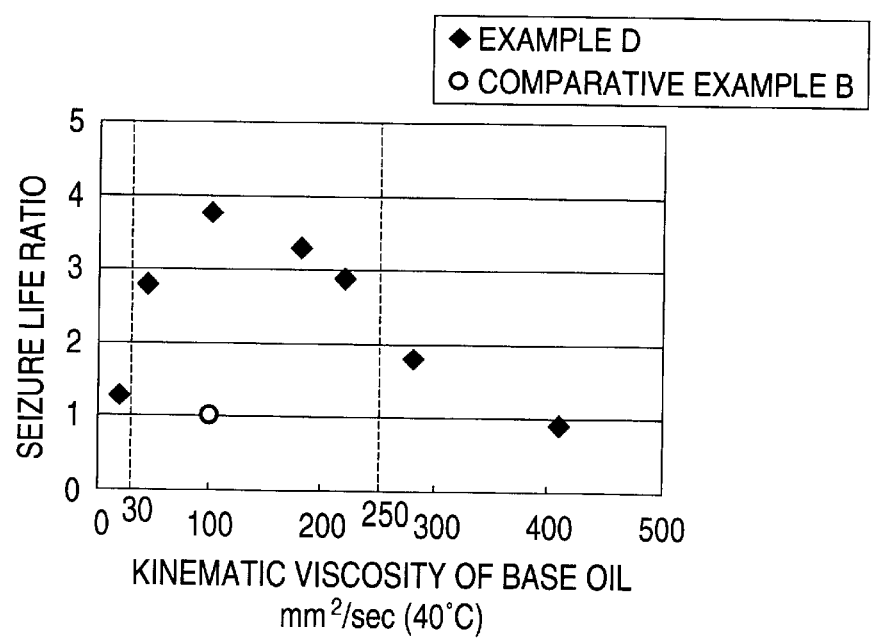
FIG. 5 is a graph showing the results of the high-temperature seizure life test.

As shown in FIG. 5, when a synthetic lubricant oil whose kinetic viscosity is from 30 to 250 mm$^2$/sec at 40° C. is used for the base oil, the seizure life of the bearing was increased to be about two times or larger. In particular when the kinetic viscosity of the synthetic lubricant oil at 40° C. is from 50 to 200 mm$^2$/sec, the seizure life of the bearing was increased to be about three times or larger.

Figure 6:
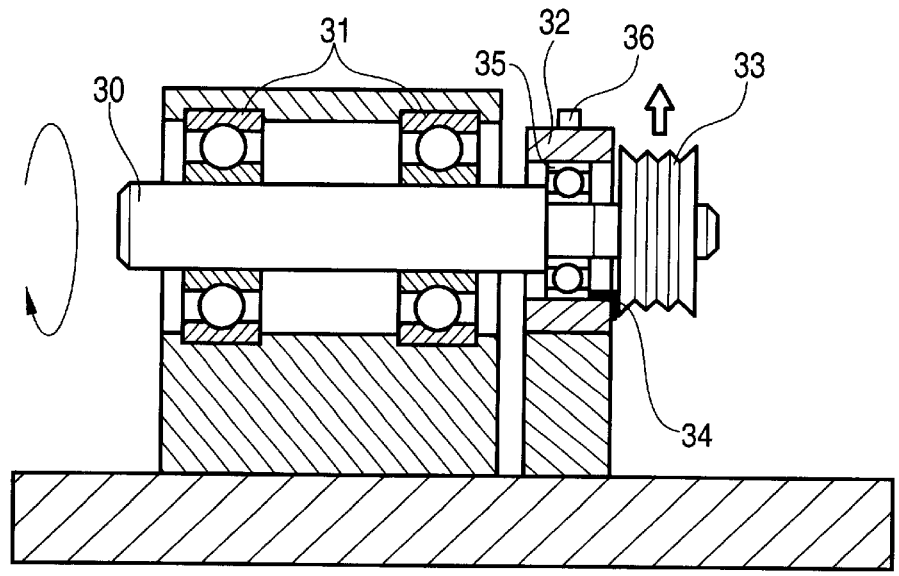
FIG. 6 is a longitudinal sectional view showing a tester used for a rapid acceleration/deceleration test in the example.

Deep groove ball bearings having contact rubber seals were used. Each ball bearing has a structure shown in FIG. 1, and dimensions of it were: inside diameter =17 mm, outside diameter =47 mm, and width =14 mm. Grease B was filled in the bearing space (S) of a ball bearing so that an amount of the grease filled was 30% of the bearing space. The flaking life of the test bearing B was evaluated by using a tester shown in FIG. 6. In the tester, an inner ring of a test bearing 35 is fit to the end of a shaft 30, which is supported by a couple of support bearings 31, 31. Further, it is fastened to a holder 32 of an outer ring. A rotation force output from an engine (not shown) is transmitted to a test bearing 35 via a pulley 33. Reference numeral 34 designates a temperature gauge; thermometer for measuring a temperature of the outer ring. Reference numeral 36 is a heater for heating the outer ring. The bearing was continuously rotated for 300 hours as a rough standard under the conditions that the engine speed is from 1200 to 9600 min$^{-1}$, the temperature of the outer ring of the bearing is 120° C., and the pulley load is 980N. The number of tests was 10 for each example, and a probability of flaking occurrence was calculated by using the following equation.

Flaking occurrence probability={(number of flaking occurrences/ number of tests)}×100

Figure 7:
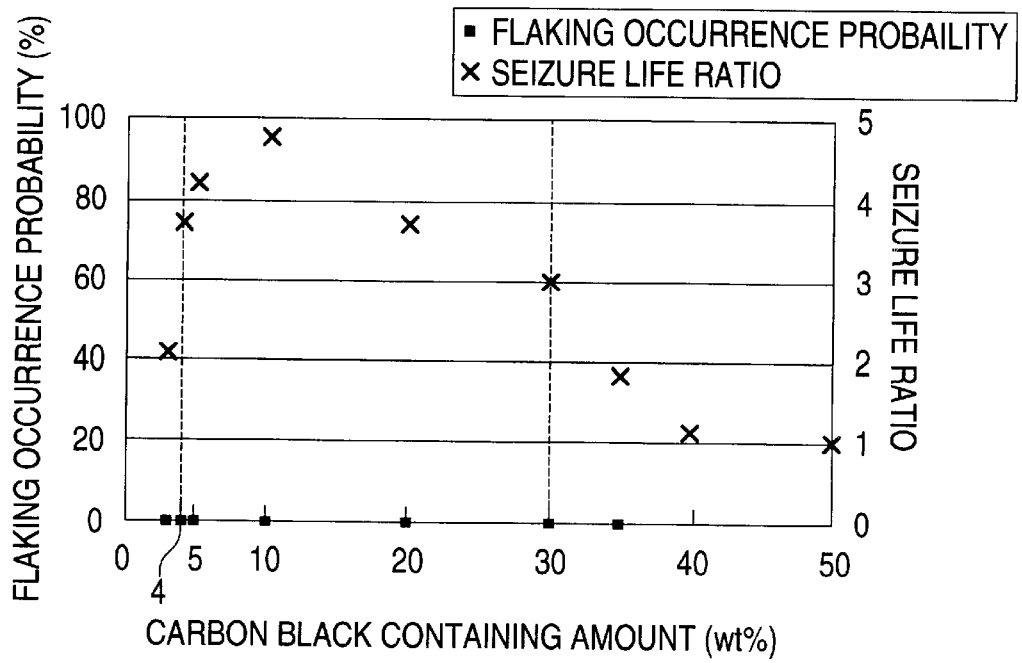
FIG. 7 is a graph showing the results of the rapid acceleration/deceleration test.

The results of measuring the flaking occurrence probability are shown in FIG. 7, and as seen from the graph, the flaking can be prevented by filling the bearing with the grease containing the carbon black as the thickening agent.

The results of the high-temperature seizure life test are plotted in terms of relative value in FIG. 7. In the graph, the seizure time of the test bearing filled with a grease containing 50 wt % carbon black was set at 1. The graph also teaches that when the amount of carbon black contained in the grease filling the bearing is within a range from 4 to 30 wt %, the lifetime improvement is remarkable. The reason for this may be estimated that as the result of presence of a predetermined amount of carbon black in the grease, the conduction of the inner ring, the outer ring and the rolling elements is kept good, and hence the hydrogen brittleness is suppressed and the grease has a proper fluidity.

As seen from the foregoing description, the present invention succeeds in providing a rolling bearing which is excellent in the heat resistance and the flaking preventing effect. The rolling bearing is suitably applied to a device which is run under the conditions of high temperature, high speed and high load, and water is easy to enter into it, such as vehicle electrical component parts, an alternator and an intermediate pulley as engine auxiliary equipment, and an electromagnetic clutch for car air-conditioner.

While only certain embodiments of the invention have been specifically described herein, it will apparent that numerous modifications may be made thereto without departing from the spirit and scope of the invention.

What is claimed is:

1. A rolling bearing comprising:
an inner ring;
an outer ring;
a plurality of rolling elements arranged rotatably between the inner ring and the outer ring;
a retainer for retaining the plurality of rolling elements; and
a grease composition filled in a bearing space defined by the inner ring, the outer ring, and the rolling elements;
wherein the grease composition contains a base oil including of fluorocarbon polymer oil, a thickening agent including a polytetrafluoroethylene, and a conductive material,
wherein an amount of the conductive material contained in the grease composition is in a range from 0.1 to 10 wt % with respect to the total weight of the grease composition.

2. The rolling bearing as set forth in claim 1, wherein the fluorocarbon polymer oil has a viscosity ranged from 20 to 200 mm²/sec at 40° C.

3. The rolling bearing as set forth in claim 2, wherein the fluorocarbon polymer oil has a side-chain structure.

4. The rolling bearing as set forth in claim 1, wherein the conductive material is a carbon black.

5. The rolling bearing as set forth in claim 4, wherein an average particle size of the carbon black is within a range from 10 to 300 nm.

6. A rolling bearing being lubricated by grease and used for vehicle electrical component parts and engine auxiliary equipment, the rolling bearing comprising:
an inner ring;
an outer ring;.
a plurality of rolling elements arranged rotatably between the inner ring, and the outer ring;
a retainer for retaining the plurality of rolling elements; and a grease filling the rolling bearing;
wherein the grease contains a base oil and a thickening agent including carbon black, the base oil is a synthetic oil having viscosity from 30 to 250 mm²/sec at 40° C., and the amount of the carbon black is within a range from 4 to 30 wt %, based on the total weight of the grease composition.

7. The rolling bearing as set forth in claim 6, wherein an average particle size of the carbon black is within a range, from 10 to 300 nm.

8. The rolling bearing as set forth in claim 7, wherein the base oil is a synthetic oil having viscosity from 50 to 200 mm²/sec at 40° C.

9. The rolling bearing as set forth in claim 8, wherein a worked penetration of the grease composition is within the grades of No. 1 to No. 3 as defined in NLGI.

10. The rolling bearing as set forth in claim 9, wherein the base oil is ether oil or ester oil.

11. The rolling bearing as set forth in claim 10, wherein the bearing includes at least one seal.

12. The rolling bearing as set forth in claim 9, wherein the base oil is a synthetic oil having viscosity from greater than 80 to 200 mm²/sec.

13. A rolling bearing being lubricated by grease and disposed in a vehicle electrical component part or engine auxiliary equipment driven by a belt, the rolling bearing comprising:
an inner ring;
an outer ring;
a plurality of rolling elements arranged rotatably between the inner ring and the outer ring;
a retainer for retaining the plurality of rolling elements; and
a grease filling the rolling bearing,
wherein the grease contains a base oil and a thickening agent including carbon black, the base oil is a synthetic oil having viscosity from 30 to 250 mm²/sec at 40° C., and the amount of the carbon black is within a range from 4 to 30 wt %, based on the total weight of the grease composition.

14. The rolling bearing as set forth in claim 13, wherein an average particle size of the carbon black is within a range from 10 to 300 nm.

15. The rolling bearing as set forth in claim 14, wherein the base oil is a synthetic oil having viscosity from 50 to 200 mm²/sec at 40° C.

16. The rolling bearing as set forth in claim 15, wherein a worked penetration of the grease composition is within the grades of No. 1 to No. 3 as defined in NLGI.

17. The rolling bearing as set forth in claim 16, wherein the base oil is ether oil or ester oil.

18. The rolling bearing as set forth in claim 17, wherein the bearing includes at least one seal.

19. The rolling bearing as set forth in claim 15, wherein the base oil is a synthetic oil having viscosity from greater than 80 to 200 mm²/sec.

* * * * *